United States Patent
Kwon

(10) Patent No.: US 7,864,636 B2
(45) Date of Patent: Jan. 4, 2011

(54) MULTI-LAYERED OPTICAL RECORDING MEDIUM, ADDRESS ASSIGNMENT METHOD FOR MULTI-LAYERED OPTICAL RECORDING MEDIUM, APPARATUS AND METHOD OF REPRODUCING AND METHOD OF RECORDING

(75) Inventor: Joon-hwan Kwon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 644 days.

(21) Appl. No.: 11/832,078

(22) Filed: Aug. 1, 2007

(65) Prior Publication Data

US 2008/0130426 A1 Jun. 5, 2008

(30) Foreign Application Priority Data

Dec. 5, 2006 (KR) .................. 10-2006-0122583

(51) Int. Cl.
 *G11B 7/00* (2006.01)
(52) U.S. Cl. ............... 369/30.1; 369/59.25; 369/94; 369/275.3
(58) Field of Classification Search .............. None
 See application file for complete search history.

(56) References Cited

U.S. PATENT DOCUMENTS 5,303,225 A * 4/1994 Satoh et al. ............ 369/275.3
5,881,032 A * 3/1999 Ito et al. ................. 369/30.1

FOREIGN PATENT DOCUMENTS

| EP | 1727137 | 11/2006 |
|---|---|---|
| WO | WO 2006/075696 | 7/2006 |
| WO | WO 2006/075698 | 7/2006 |
| WO | WO 2006/075700 | 7/2006 |
| WO | WO 2006/013823 | 9/2006 |

OTHER PUBLICATIONS

International Search Report and Written Opinion issued in corresponding PCT International Application No. PCT/KR2007/005097 dated Jan. 25, 2008.

* cited by examiner

Primary Examiner—Wayne R Young
Assistant Examiner—Brian Butcher
(74) Attorney, Agent, or Firm—NSIP Law

(57) ABSTRACT

A optical recording medium wherein a sector address is assigned such that a sector address of a first recording layer is a complement of a sector address of a second recording layer adjacent to the first recording layer, and a sector address of each of the remaining recording layers is assigned such that the difference between the assigned sector address of one of the remaining recording layers and a sector address of another one of the remaining recording layers that is located two layers below the one of the remaining recording layers having an assigned sector address is the same as a predetermined offset value, and the first recording layer is any one of the bottom recording layer and the top recording layer from among the recording layers, and a different sector address is assigned to each recording layer is provided.

10 Claims, 11 Drawing Sheets

(12) United States Patent

MULTI-LAYERED OPTICAL RECORDING MEDIUM, ADDRESS ASSIGNMENT METHOD FOR MULTI-LAYERED OPTICAL RECORDING MEDIUM, APPARATUS AND METHOD OF REPRODUCING AND METHOD OF RECORDING

CROSS-REFERENCE TO RELATED APPLICATION

This application claims the benefit of Korean Patent Application No. 2006-122583, filed on Dec. 5, 2006 in the Korean Intellectual Property Office, the disclosure of which is incorporated herein in its entirety by reference.

BACKGROUND OF THE INVENTION

1. Field of the Invention

An aspect of the present invention relates to a multi-layered optical recording medium, a method of assigning an address in a multi-layered optical recording medium, a reproducing apparatus, a reproducing method, and a recording method, thereof.

2. Description of the Related Art

FIG. 1 is a diagram illustrating a sector structure on an optical recording medium according to conventional technology. Generally, an optical recording medium has one- or two-layer recording surfaces. In each recording layer, a spiral track is formed, and the track is divided into a plurality of sectors. Each sector has a storage capacity, such as 512 bytes or 2048 bytes, and is used as a data recording unit.

In order to maximize the storage capacity of an optical recording medium, the recording density of the optical recording medium is made to be constant across the whole disk surface, and to do so, all sectors, as illustrated in FIG. 1, have identical sizes. Also, in order to guarantee that a predetermined amount of data is reproduced in a unit of time, the disk is driven by a constant linear velocity (CLV) control. According to the CLV control, the disk is rotated at a variable velocity with respect to the radial position on the disk of an optical head projecting a beam spot that converges on the disk during a predetermined interval in a unit of time.

FIG. 2A is a diagram illustrating a sector structure of an optical recording medium such as a digital versatile disk (DVD) in particular, according to conventional technology. Each sector of the DVD includes a header in which an address for identifying a sector is recorded, a data block in which user data is recorded, and an error correction code (ECC) in which a code to be used for correcting an error during reproduction of data is recorded.

FIG. 2B is a diagram illustrating a recording area structure of an optical recording medium such as a Blue-ray disk (BD) in particular, according to conventional technology. Referring to FIG. 2B, the optical recording medium can be divided into three parts including a lead-in area, a data area and a lead-out area. In particular, the data area is composed of a user data area in which actual user data is recorded, and a spare area, which is used to replace a defective area in the user data area. The spare area is composed of an inner spare area (ISA) positioned on an inner circumference of the data area, and an outer spare area (OSA) positioned on an outer circumference of the data area.

In the recording area structure of a BD, formed as illustrated in FIG. 2B, data is recorded on units of clusters in all areas of the data area, and in particular, each cluster is further divided into a plurality of recording units. This recording unit is referred to as a 'sector'. In each cluster, a plurality of sectors are disposed, and an address unit number (AUN) is given to each two sectors.

Methods of increasing a storage capacity in an optical recording medium include a method of using a laser with a shorter wavelength in order to increase recording and reproducing density, and a method of building multiple layers on one disk. Current optical recording media usually have one or two recording layers, however, in order to increase a storage capacity of current optical recording media, a disk having a plurality of recording layers can be considered. In a multi-layered optical recording medium, assignment of addresses is important since an address should be unique in an optical recording medium, and address information requires a storage space separate from data. The smaller the size of the address information, the wider the storage space required for storing data.

FIG. 3A is a diagram illustrating an example of assigning a sector address on a multi-layered optical recording medium according to conventional technology. Information on an address assigned on a multi-layered optical recording medium includes a layer address indicating a layer number, and a sector address indicating the address of a sector. A layer address is identical in relation to one layer, and a different value is assigned as a sector address to each sector. FIG. 3A illustrates the sector address of an optical recording medium having 4 recording layers (L1, L2, L3, and L4). On an identical radial position of different layers, the sector address of each recording layer is identical. For each recording layers, on a radial position of Rin, Rout and R, a sector address is Xin, Xout and X respectively. In this case, since an identical sector address appears in each layer, it is possible that data of a different layer be reproduced using the same sector address.

FIG. 3B is a diagram illustrating another example of assigning a sector address on a multi-layered optical recording medium according to conventional technology. Referring to FIG. 3B, recording layers of an optical recording medium are divided into odd-numbered layers and even-numbered layers. Sector addresses are assigned such that sector addresses in all the odd-numbered layers are identical to each other and sector addresses in all the even-numbered layers are identical to each other. Also, sector addresses are assigned such that a sector address of an odd-numbered layer is a complement of a sector address of an even-numbered layer. In this case, even if addresses of the odd-numbered layers and the even-numbered layers are different from each other, data in the different layers can be reproduced because of the assigning of the complement addresses.

SUMMARY OF THE INVENTION

An aspect of the present invention provides a multi-layered optical recording medium, a method of assigning an address in a multi-layered optical recording medium, a reproducing apparatus, a reproducing method, and a recording method in which the reproducing of data in an incorrect position can be prevented.

According to an aspect of the present invention, there is provided an optical recording medium having a plurality of recording layers, wherein a sector address is assigned such that the sector address of a first recording layer is a complement of a sector address of a second recording layer adjacent to the first recording layer, and a sector address of each of the remaining recording layers is assigned such that a difference between the assigned sector address of one of the remaining recording layers and a sector address of another one of the recording layers that is two recording layers below one of the remaining recording layers having an assigned sector address is the same as a predetermined offset value, and the first recording layer is any one of the bottom recording layer and the top recording layer from among the recording layers.

According to another aspect of the present invention, the sector address on an odd-numbered recording layer from among the recording layers may increase from one circumference side to the other circumference side, and the sector address on an even-numbered recording layer from among the recording layers may increase from the other circumference side to the one circumference side, and the one circumference side may be any one of an innermost circumference and an outermost circumference, and the other circumference side may be the other of the innermost circumference and the outermost circumference.

According to another aspect of the present invention, each recording layer may have a layer address different from each other, and the layer address may be identical in all sectors on one recording layer.

According to another aspect of the present invention, the offset value may be large enough such that sector addresses of different recording layers at an identical radial position are not identical.

According to another aspect of the present invention, if the number of recording layers is an even number, the offset value may be less than or equal to a value obtained by dividing a spare address space, which remains after storing data, by a number, which is (the number of the recording layers)/2.

According to another aspect of the present invention, if the number of the recording layers is an odd number, the offset value may be less than or equal to a value obtained by dividing a spare address space, which remains after storing data, by a number, which is (the number of the recording layers+1)/2.

According to another aspect of the present invention, there is provided an optical recording medium having a plurality of recording layers, wherein each of the recording layers includes a plurality of sectors, and one sector address is assigned to an even number of sectors from among the sectors, and a sector address is assigned such that a value obtained by adding 1 to an sector address of a first recording layer is a complement of a sector address of a second recording layer adjacent to the first recording layer, and a sector address of each recording layer is assigned such that the difference between the assigned sector address and a sector address of a layer that is two layers below the layer of the assigned sector address is the same as a predetermined offset value, and the first recording layer is any one of the bottom recording layer and the top recording layer from among the recording layers.

According to another aspect of the present invention, the sector address on an odd-numbered recording layer from among the of recording layers may increase from one circumference side to the other circumference side, and the sector address on an even-numbered recording layer from among the recording layers may increase from the other circumference side to the one circumference side, and the one circumference side may be any one of an innermost circumference and an outermost circumference, and the other circumference side may be the other of the innermost circumference and the outermost circumference.

According to another aspect of the present invention, the offset value may be large enough such that sector addresses of different recording layers at an identical radial position are not identical.

According to another aspect of the present invention, if the number of the recording layers is an even number, the offset value may be less than or equal to a value obtained by dividing a spare address space, which remains after storing data, by a number, which is (the number of the recording layers)/2.

According to another aspect of the present invention, if the number of recording layers is an odd number, the offset value may be less than or equal to a value obtained by dividing a spare address space, which remains after storing data, by a number, which is (the number of the recording layers+1)/2.

According to another aspect of the present invention, there is provided a method of assigning an address on an optical recording medium having a plurality of recording layers, the method including assigning a sector address to a first recording layer, which is any one of the bottom recording layer and the top recording layer from among the recording layers; assigning a sector address to a second recording layer, adjacent to the first recording layer, such that the assigned sector address to the second recording layer is a complement of the sector address of the first recording layer; and assigning a sector address to each recording layer, excluding the first and second recording layer, such that the difference between the assigned sector address to each recording layer and a sector address of a layer that is two layers below the layer of the assigned sector address is the same as a predetermined offset value.

According to another aspect of the present invention, the sector address on an odd-numbered recording layer from among the recording layers may increase from one circumference side to the other circumference side, and the sector address on an even-numbered recording layer from among the recording layers may increase from the other circumference side to the one circumference side, and the one circumference side may be any one of an innermost circumference and an outermost circumference, and the other circumference side may be the other of the innermost circumference and the outermost circumference.

According to another aspect of the present invention, the offset value may be large enough such that sector addresses of different recording layers at an identical radial position are not identical.

According to another aspect of the present invention, if the number of recording layers is an even number, the offset value may be less than or equal to a value obtained by dividing a spare address space, which remains after storing data, by a number, which is (the number of the recording layers)/2.

According to another aspect of the present invention, if the number of recording layers is an odd number, the offset value may be less than or equal to a value obtained by dividing a spare address space, which remains after storing data, by a number, which is (the number of the recording layers+1)/2.

According to another aspect of the present invention, there is provided a method of assigning an address on an optical recording medium having a plurality of recording layers, the method including assigning a sector address to a first recording layer, which is any one of the bottom recording layer and the top recording layer from among the recording layers; assigning a sector address to a second recording layer, adjacent to the first recording layer, such that the assigned sector address is a complement of a value obtained by adding 1 to the sector address of the first recording layer; and assigning a sector address to each recording layer, excluding the first and second recording layer, such that the difference between the assigned sector address to each recording layer and a sector address of a layer that is two layers below the layer of the assigned sector address to each recording layer is the same as a predetermined offset value, wherein each recording layer comprises a plurality of sectors and one sector address is assigned to an even number of sectors from among the sectors.

According to another aspect of the present invention, the sector address on an odd-numbered recording layer from among the recording layers may increase from one circumference side to the other circumference side, and the sector address on an even-numbered recording layer from among the recording layers may increase from the other circumference side to the one circumference side, and the one circumference side may be any one of an innermost circumference and an outermost circumference, and the other circumference side may be the other of the innermost circumference and the outermost circumference.

According to another aspect of the present invention, the offset value may be large enough such that sector addresses of different recording layers at an identical radial position are not identical.

According to another aspect of the present invention, if the number of the recording layers is an even number, the offset value may be less than or equal to a value obtained by dividing a spare address space, which remains after storing data, by a number, which is (the number of the recording layers)/2.

According to another aspect of the present invention, if the number of recording layers is an odd number, the offset value may be less than or equal to a value obtained by dividing a spare address space, which remains after storing data, by a number, which is (the number of the recording layers+1)/2.

According to another aspect of the present invention, there is provided a method of reproducing data on a multi-layered optical recording medium, the method including moving an optical head unit to a target position corresponding to an address on the recording layer; and reproducing data on the optical recording medium at the moved position, wherein in the address on the recording layer, a sector address is assigned such that a sector address of a first recording layer is a complement of a sector address of a second recording layer adjacent to the first recording layer, and a sector address of each recording layer is assigned such that the difference between the assigned sector address to each recording layer and a sector address of a layer that is two layers below the layer of the assigned sector address is the same as a predetermined offset value, and the first recording layer is any one of the bottom recording layer and the top recording layer from among the recording layers.

According to another aspect of the present invention, the method may further include before the moving of the optical head unit to the target position: detecting a reproduction direction of a sector address on the optical recording medium; and converting the sector address to a logical space continuing across a plurality of recording layers.

According to another aspect of the present invention, the detecting of the reproduction direction of the sector address may include: reading a sector address at a first position on a recording layer on which an optical head unit is focused; moving the optical head unit in the radial direction of the recording layer; reading a sector address at a second position to which the optical head unit is moved; and detecting the reproduction direction by comparing the sector addresses at the first position and the second position, respectively.

According to another aspect of the present invention, the detecting of the reproduction direction may include: identifying the number of the recording layer on which the optical head unit is focused; and detecting the reproduction direction of the sector address according to the identified number of the recording layer.

According to another aspect of the present invention, there is provided an apparatus for reproducing data on a multi-layered optical recording medium, the apparatus including a control unit moving an optical head unit to a target position corresponding to an address on a recording layer; and a pickup unit reproducing data on the optical recording medium at the moved position, wherein in the address on the recording layer, a sector address is assigned such that a sector address of a first recording layer is a complement of a sector address of a second recording layer adjacent to the first recording layer, and a sector address of each recording layer is assigned such that the difference between the assigned sector address to each recording layer and a sector address of a layer that is two layers below the layer of the assigned sector address to each recording layer is the same as a predetermined offset value, and the first recording layer is any one of the bottom recording layer and the top recording layer from among the recording layers.

According to another aspect of the present invention, there is provided an apparatus for reproducing data on a multi-layered optical recording medium, the apparatus including a control unit moving an optical head unit to a target position corresponding to an address on a recording layer; and a pickup unit reproducing data on the optical recording medium at the moved position, wherein each of the recording layers comprises a plurality of sectors, and one sector address is assigned to an even number of sectors from among the sectors, and in the address on the recording layer, a sector address is assigned such that a value obtained by adding 1 to a sector address of a first recording layer is a complement of a sector address of a second recording layer adjacent to the first recording layer, and a sector address of each recording layer is assigned such that the difference between the assigned sector address to each recording layer and a sector address of a layer that is two layers below the layer of the assigned sector address to each recording layer is the same as a predetermined offset value, and the first recording layer is any one of the bottom recording layer and the top recording layer from among the recording layers.

According to another aspect of the present invention, there is provided an apparatus for recording data on a multi-layered optical recording medium, the apparatus including a signal processing unit generating a data block formed with an address and data; and a pickup unit recording the generated data block on the recording medium, wherein in the address, a sector address is assigned such that a sector address of a first recording layer is a complement of a sector address of a second recording layer adjacent to the first recording layer, and a sector address of each recording layer is assigned such that the difference between the assigned sector address to each recording layer and a sector address of a layer that is two layers below the layer of the assigned sector address to each recording layer is the same as a predetermined offset value, and the first recording layer is any one of the bottom recording layer and the top recording layer from among the recording layers.

According to another aspect of the present invention, there is provided an apparatus for recording data on a multi-layered optical recording medium, the apparatus including a signal processing unit generating a data block formed with an address and data; and a pickup unit recording the generated data block on the recording medium, wherein each of the recording layers comprises a plurality of sectors, and one sector address is assigned to an even number of sectors from among the sectors, and in the address, a sector address is assigned such that a value obtained by adding 1 to a sector address of a first recording layer is a complement of a sector address of a second recording layer adjacent to the first recording layer, and a sector address of each recording layer is assigned such that the difference between the assigned sector address to each recording layer and a sector address of a layer that is two layers below the layer of the assigned sector address to each recording layer is the same as a predetermined offset value, and the first recording layer is any one of the bottom recording layer and the top recording layer from among the recording layers.

According to another aspect of the present invention, there is provided a method of recording data on an optical recording medium, the method including generating a data block formed with an address and data; and recording the generated data block on the recording medium, wherein in the address, a sector address is assigned such that a sector address of a first recording layer is a complement of a sector address of a second recording layer adjacent to the first recording layer, and a sector address of each recording layer is assigned such that the difference between the assigned sector address to each recording layer and a sector address of a layer that is two layers below the layer of the assigned sector address to each recording layer is the same as a predetermined offset value, and the first recording layer is any one of the bottom recording layer and the top recording layer from among the recording layers.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
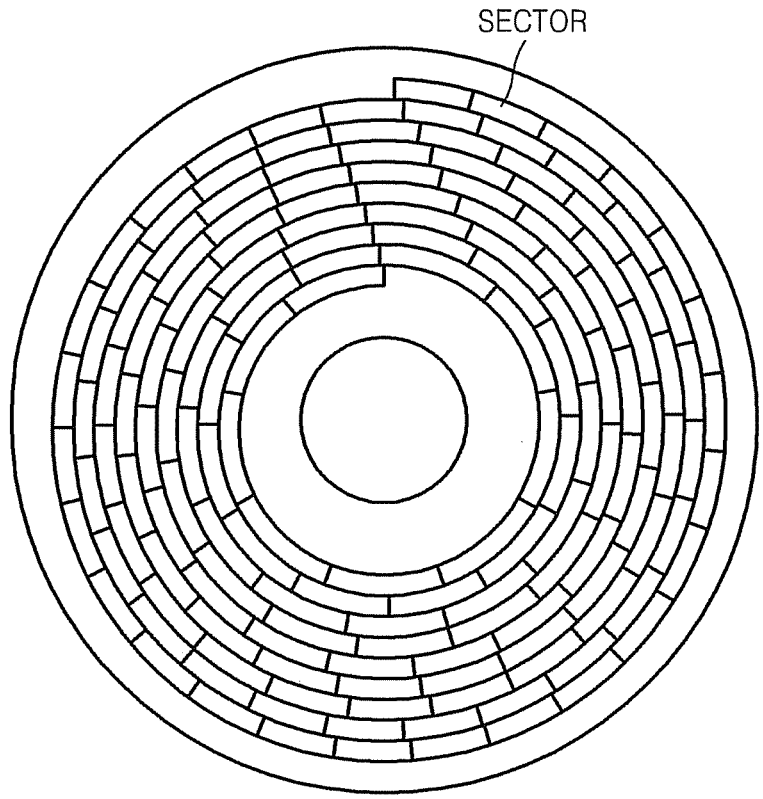
FIG. 1 is a diagram illustrating a sector structure on an optical recording medium according to conventional technology.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 4A:
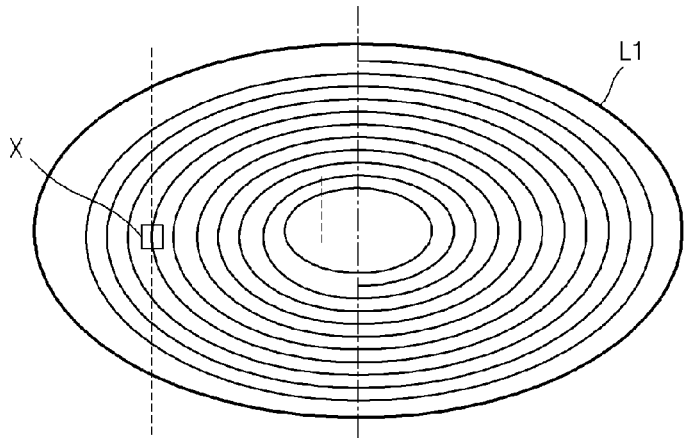
FIG. 4A and FIG. 4B are diagrams illustrating examples of the shape and direction of tracks on an optical recording medium including two recording layers according to conventional technology.
Figure 4B:
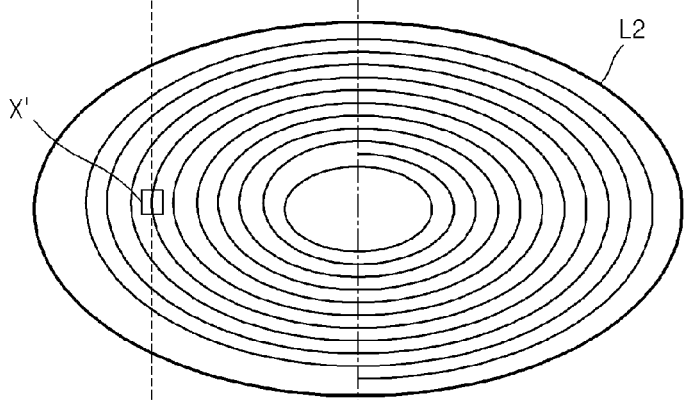

FIG. 4A and FIG. 4B are diagrams illustrating examples of the shape and direction of tracks on an optical recording medium including two recording layers according to conventional technology.

In particular, FIG. 4A illustrates the shape and direction of tracks of a first recording layer (L1) of the optical recording medium according to conventional technology, and FIG. 4B illustrates the shape and direction of tracks of a second recording layer (L2) of the optical recording medium according to conventional technology. In this case, the first recording layer is one of two recording layers and the second recording layer is the other one of the two recording layers. The directions of the tracks of the first recording layer and the second recording layer are opposite to each other. As such, if the tracks of each layer have opposite spiral shapes, this is referred to as an opposite track path. In the case of the L1, data is reproduced from an inner circumference to an outer circumference, and in the case of the L2, data is reproduced from an outer circumference to an inner circumference. In the same manner as data reproduction, the address indicating the position of data increases from an inner circumference to an outer circumference in the case of the L1, and from an outer circumference to an inner circumference in the case of the L2.

Figure 4C:
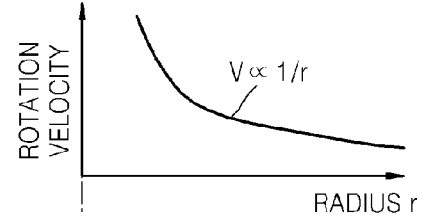
FIG. 4C illustrates the rotation velocity with respect to the radius of an optical recording medium according to conventional technology.

FIG. 4C illustrates the rotation velocity with respect to the radius of an optical recording medium according to conventional technology. In a constant linear velocity (CLV) reproduction method, in order to guarantee reproduction of a predetermined amount data in a unit of time, the rotation velocity of the optical recording medium is controlled in order to maintain a predetermined linear velocity constant. Thus, the rotation velocity decreases as a head moves from an inner circumference to an outer circumference of the optical recording medium. Accordingly, the rotation velocity of a disk is in inverse proportion to the radius of the disk.

Figure 4D:
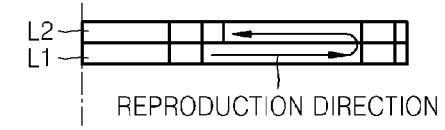
FIG. 4D illustrates the reproduction direction of an optical recording medium having two recording layers according to conventional technology

FIG. 4D illustrates the reproduction direction of an optical recording medium having two recording layers according to conventional technology. In order to enable smooth and continuous reproduction of data from a first recording layer (L1) to a second recording layer (L2), the directions of the spiral tracks on the L1 and L2 should be opposite to each other as illustrated in FIGS. 4A and 4B. Data on the L1 is reproduced from an inner circumference to an outer circumference, and data on the L2 is reproduced from an outer circumference to an inner circumference. Accordingly, data is reproduced in the direction as illustrated in FIG. 4D. User data is recorded on the data blocks of the L1 and the L2, and addresses are recorded on the header areas.

Figure 5:
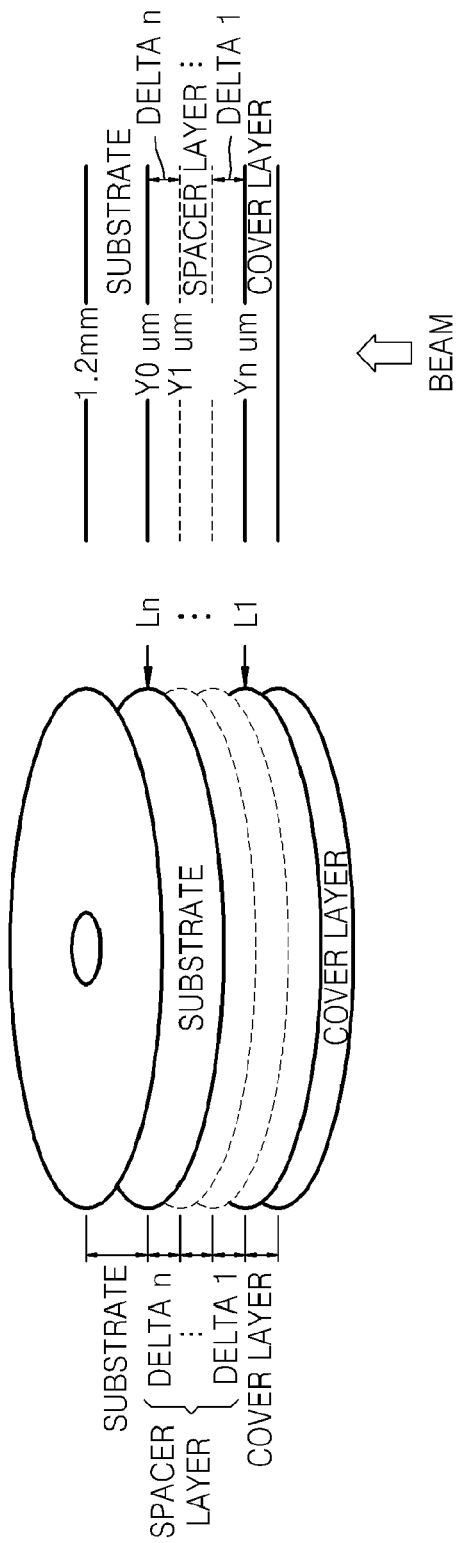
FIG. 5 is a diagram illustrating a structure of a multi-layered optical recording medium according to conventional technology.

FIG. 5 is a diagram illustrating a structure of a multi-layered optical recording medium according to conventional technology. In the multi-layered optical recording medium, a plurality of recording layers in which a portion of a light beam is reflected and a portion of the light beam is passed are stacked relative to one another. A space layer is disposed between each recording layer. A cover layer is disposed on a side in which the light beam from a pickup is incident on the optical recording medium. On top of the multi-layered optical recording medium, a substrate layer is disposed. Each recording layer is formed with a spiral track. From the bottom recording layer to the top recording layer, adjacent recording layers have spiral tracks spiraling in directions opposite to each other. For example, the spiraling directions of the first recording layer and the second recording layer are opposite to each other, and the spiraling directions of the second recording layer and the third recording layer are opposite to each other. Hence, the track directions are the same for every second or other recording layer. Each track of the recording layers is divided into sectors of identical length, and an address is assigned to each sector.

Figure 2A:
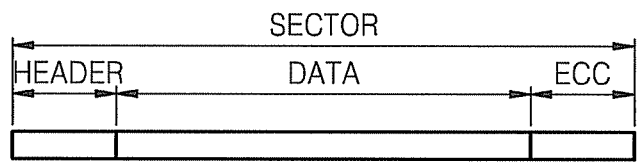
FIG. 2A is a diagram illustrating a sector structure of an optical recording medium such as a digital versatile disk (DVD) in particular, according to conventional technology.
Figure 2B:
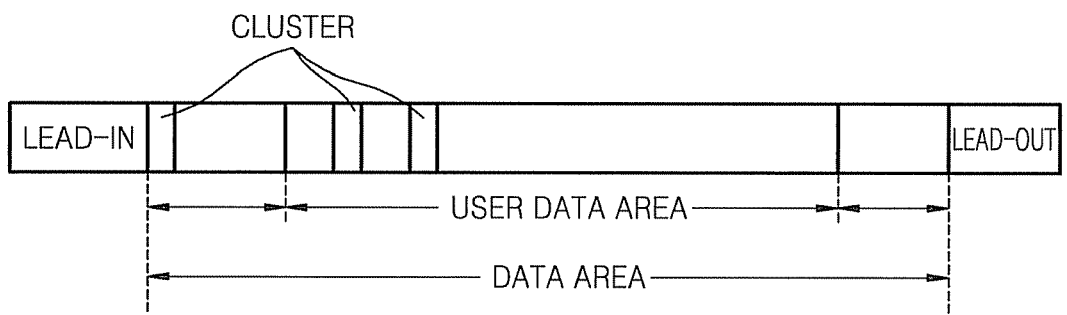
FIG. 2B is a diagram illustrating a recording area structure of an optical recording medium such as a Blue-ray disk (BD) in particular, according to conventional technology.
Figure 3A:
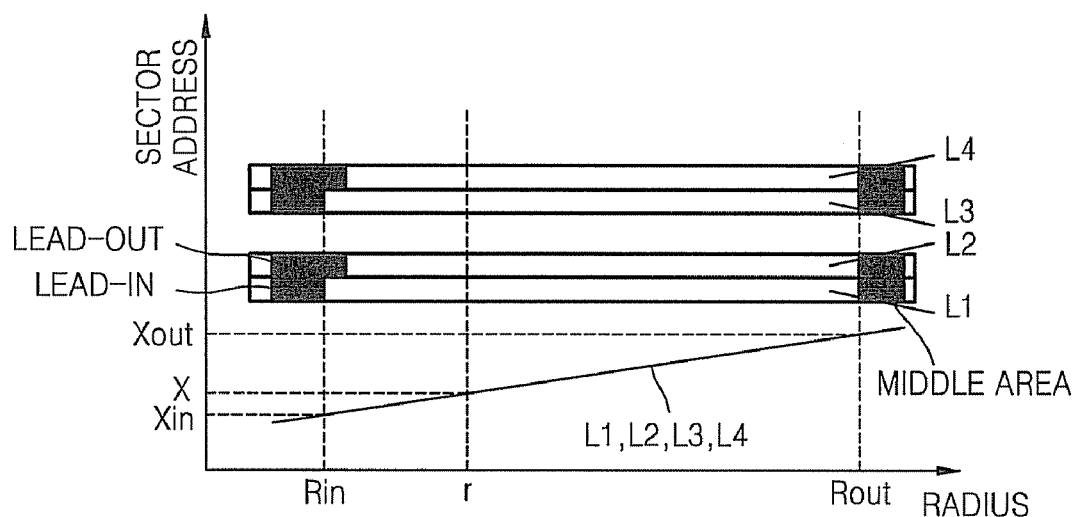
FIG. 3A is a diagram illustrating an example of assigning a sector address on a multi-layered optical recording medium according to conventional technology.
Figure 3B:
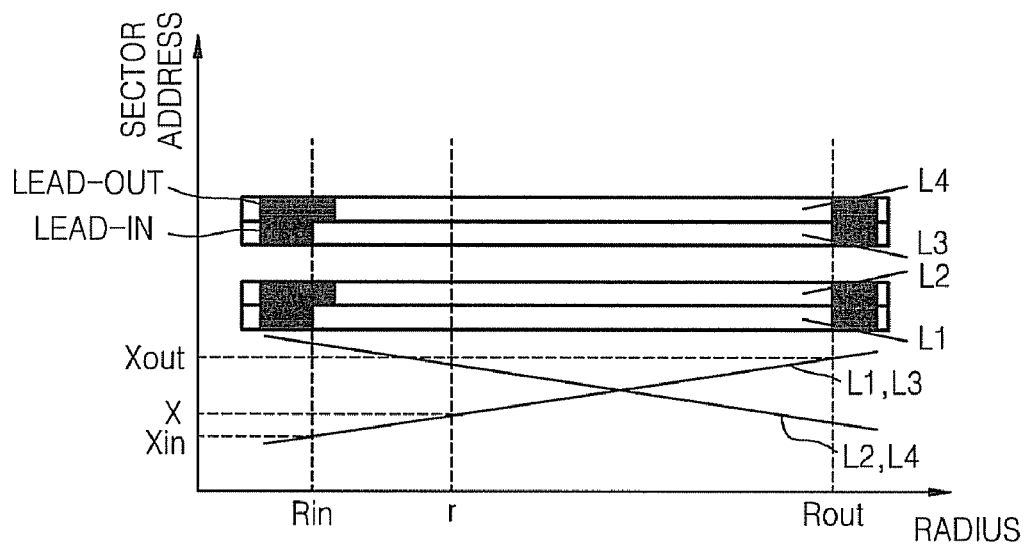
FIG. 3B is a diagram illustrating another example of assigning a sector address on a multi-layered optical recording medium according to conventional technology.
Figure 6:
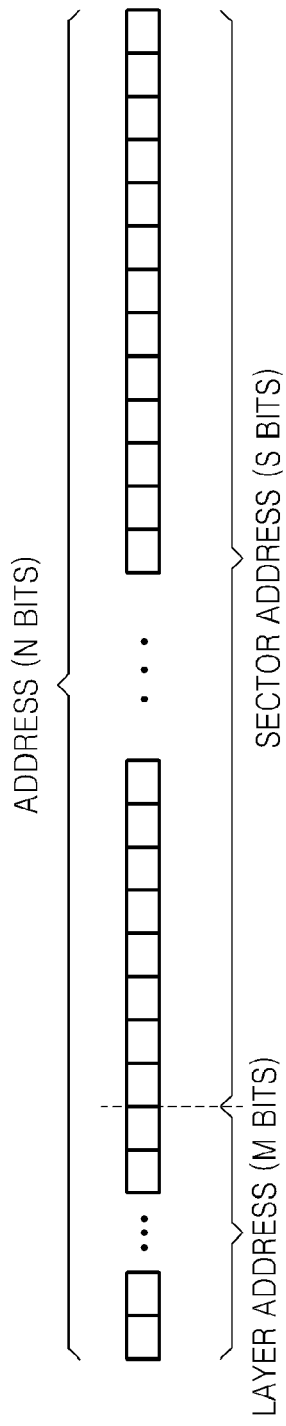
FIG. 6 is a diagram illustrating an address field of a multi-layered optical recording medium according to an embodiment of the present invention.

FIG. 6 is a diagram illustrating an address field of a multi-layered optical recording medium according to an embodiment of the present invention. The addresses of a multi-layered optical recording medium include a layer address indicating the number of a recording layer and a sector address indicating a sector number. The number of bits M of a layer address and the number of bits of a sector address S are added to make the number of an entire address N. As the space allocated to the addresses decreases, the amount of data that can be stored on the disk increases. An address of an optical recording medium, and in particular, a BD, is recorded on a cluster as described above with reference to FIG. 2B. A layer address is set as high order bits in an address field. Each recording layer has a different layer address and sectors included in one recording layer have identical layer addresses. For example, in the case of an optical recording medium having four recording layers, a first recording layer (L1) may have an address of 00, a second recording layer (L2) may have an address of 01, a third recording layer (L3) may have an address of 10, and a fourth recording layer (L4) may have an address of 11. In this case, the L1 may be the bottom recording layer or the top recording layer from among the recording layers. Also, the L1 may be a recording layer according to an order, which is arbitrarily set by a user.

Even if sectors are located on an identical recording layer, a different sector address is assigned to each sector. Conventionally, a different sector address is assigned to each sector. However, assigning a sector address to each two sectors, or each four sectors, or a group of more sectors is also possible.

In an optical recording medium according to an embodiment of the present invention, a sector address of a L1 is a complement of a sector address of a L2. For example, if the sector address of the L1 at a radial position r is 030000h, the sector address of the L2 at the same radial position is FCFFFFh.

Figure 7:
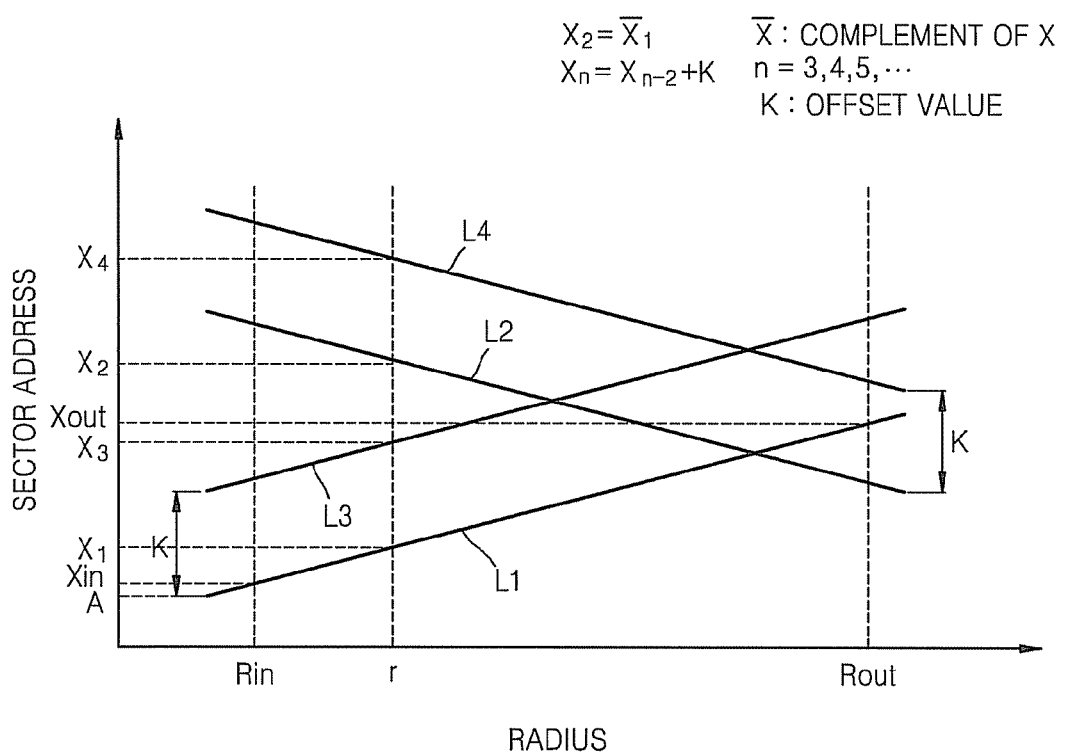
FIG. 7 is a diagram illustrating the sector address of a multi-layered optical recording medium according to an embodiment of the present invention.

FIG. 7 is a diagram illustrating the sector address of a multi-layered optical recording medium according to an embodiment of the present invention. As described above, the numbering of the recording layers may be performed from the bottom recording layer or from the top recording layer. Hence, the bottom recording layer may be a first recording layer (L1), or the top recording layer may be the L1. In the L1, the sector address increases from an inner circumference to an outer circumference, and in a second recording layer (L2), the sector address increases from an outer circumference to an inner circumference. In a third recording layer (L3), adjacent to the L2, the sector address increases from an inner circumference to an outer circumference, and in a fourth recording layer (L4), the sector address increases from an outer circumference to an inner circumference. The spiraling directions of adjacent tracks of the recording layers are opposite to each other. A sector address of the L1 is a complement of a sector address of the L2. For example, in relation to sector addresses at a radial position r, X1 is a complement of X2.

The distance between the sector addresses of the L1 and the L3 at an identical radial position is K, and the distance between the sector addresses of the L2 and the L4 at an identical radial position is K, where K is an offset value that is set in order to prevent incorrect reproduction of data when identical sector addresses are assigned to different layers.

When a different sector address is assigned to each sector, assigning of a sector is expressed as Equation 1 below:

$$X_2 = \overline{X_1}$$

$$X_n = X_{n-2} + K \quad (1)$$

In Equation 1, X is a sector address of a first recording layer, $\overline{X}$ is a complement of X, n is the number of a first recording layer, which is a layer adjacent to a second recording layer, and K is an offset value. If a sector address of the first recording layer X is determined, a complement of the sector address $\overline{X}$ is set as a sector address of the second recording layer. Sector addresses in the next layers are assigned such that the difference between an assigned sector address of one recording layer and a sector address of another recording layer, located two layers below the one recording layer having the already assigned sector address, is the same as a predetermined offset value.

When a different sector address is assigned to each two or four sectors, instead of each sector, assigning of a sector is expressed as Equation 2 below:

$$X_2 = \overline{X_1 + 1}$$

$$X_n = X_{n-2} + K \quad (2)$$

As in Equation 1, here, X is a sector address of a recording layer, $\overline{X}$ is a complement of X, n is the number of a recording layer, which is a layer after the second layer, and K is an offset. In addition to assigning a sector address to each sector, assigning a sector address to a plurality of sectors by grouping the sectors is also possible, for example, an even number of sectors, such as 2, 4, 8, or 16 sectors, can be grouped. In this case, the sector address to be assigned is a multiple of an even number. If a complement of this even sector address is obtained, the complement value is an odd number. Accordingly, in order to match the complement with an even address in an immediately below layer, a complement of a value obtained by adding 1 to the sector address is obtained. For example, in an optical recording medium in which a sector address is assigned to each two sectors, if the sector address of a first recording layer at a radial position r is 40000h, the sector address of a second recording layer at the radial position r is BFFFFh, which is a complement of a value obtained by adding 1 to 40000h.

In FIG. 7, the K offset value is less than the length of a sector address in each layer. Hence, the K offset value is less than a value obtained by subtracting Xin from Xout. This is a case where only a minimum number of bits are assigned for a sector address. As in FIG. 7, if the K offset value is small, an area for address assignment decreases, thereby, increasing a data storage space.

Figure 8:
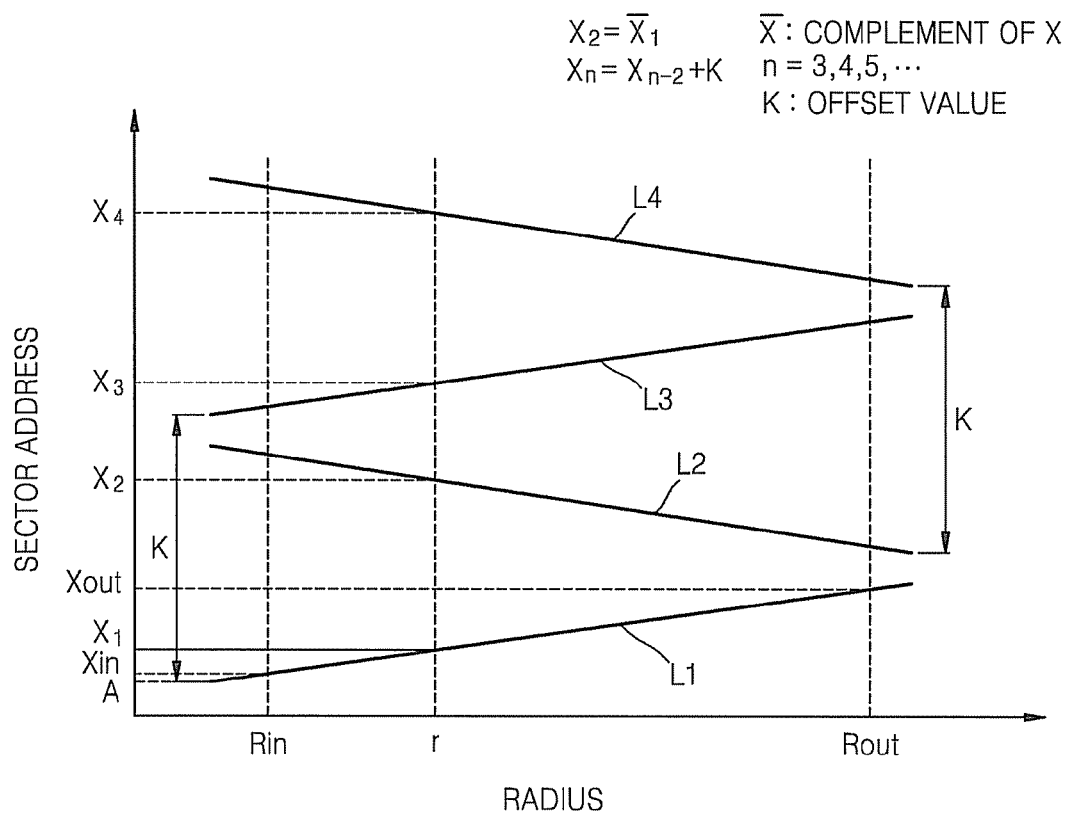
FIG. 8 is a diagram illustrating the sector address of a multi-layered optical recording medium according to another embodiment of the present invention.

FIG. 8 is a diagram illustrating the sector address of a multi-layered optical recording medium according to another embodiment of the present invention.

Unlike in FIG. 7, a K offset value in FIG. 8 is greater than the length of a sector address in each layer. Hence, the K offset value is greater than a value obtained by subtracting Xin from Xout. If the K offset value is large, the distance between radial positions at which identical sector addresses in different layers appear increases, and the possibility that a spot is formed in a different layer, and thus, incorrect data is reproduced, decreases. Accordingly, if more bits can be assigned for a sector address, the K offset value that can be used as an offset can be set to be greater than the length of the assigned sector address.

An example of assigning the K offset value by using a limited address field is expressed as Equation 3 below:

$$N = M + S \quad (3)$$
$$M = \text{ceil}(\log_2(L))$$
$$\text{Minimum requirement } S = \text{ceil}\left(\log_2\left(\frac{C}{P}\right)\right)$$

In Equation 3, C is a storage capacity (in byte units) per recording layer of a disk, L is the number of all the recording layers of the disk, N is the number of bits assigned to express an address, M is the number of bits assigned to express a recording layer number, S is the number of bits assigned to express a sector address, excluding the bits to express a recording layer number in an address, and P is the size of data included in a sector. Here, ceil(X) is a smallest integer that is equal to or greater than X.

The storage capacity C includes a space allocated by considering ordinary user data and manufacturing errors in a lead-in, lead-out, and inner circumference and outer circumference parts of the disk. Usually, by considering disk manufacturing errors and other factors, an address of an optical recording medium begins with a predetermined address that is not 0, and a spare address space is conventionally prepared as part of an outer circumference. For example, when the actual address assigned in a disk begins from 20000h and finishes at AEFFFFh, 0h~B00000h can be assigned for an address space in each recording layer. Hence, a spare address space that is a virtual address space has two parts, including 0h~1FFFFh and AF0000h~B00000h.

The maximum capacity of a disk that can be expressed by the number of bits S assigned to express a sector address is (2^S)*P. A spare address space remaining after assigning addresses to all sectors in one recording layer is (((2^S)*P)–C)/P. Assuming that this value is H, if the number of the recording layer is an even number, the largest value that can be used as an offset value is (2*H)/L and if the number of the recording layer is an odd number, a largest value that can be used as an offset value is (2*H)/(L+1).

For example, if the number of a recording layer (L) is 6, the storage capacity C desired to be stored on each recording surface is 30 gigabytes, and the number P of bytes P in each sector is 2048 bytes, then, M=3 bits, the minimum requirement for S=24, and the minimum number of required address fields N=M+S=27 bits. If an actual disk address is formed by using a minimum requirement address field that is 2, a maximum space that can be expressed by 24 bits excluding 3 bits assigned for a layer address is 2^24*2048. In the maximum address space that can be expressed, the spare address space that remains after allocating a space desired for storage is H=(2^24*2048−30,000,000,000)/2048=2,128,778. In actual implementation, a value close to a largest offset value can be selected to fit the purpose of a system by considering a start address of the address.

Figure 9:
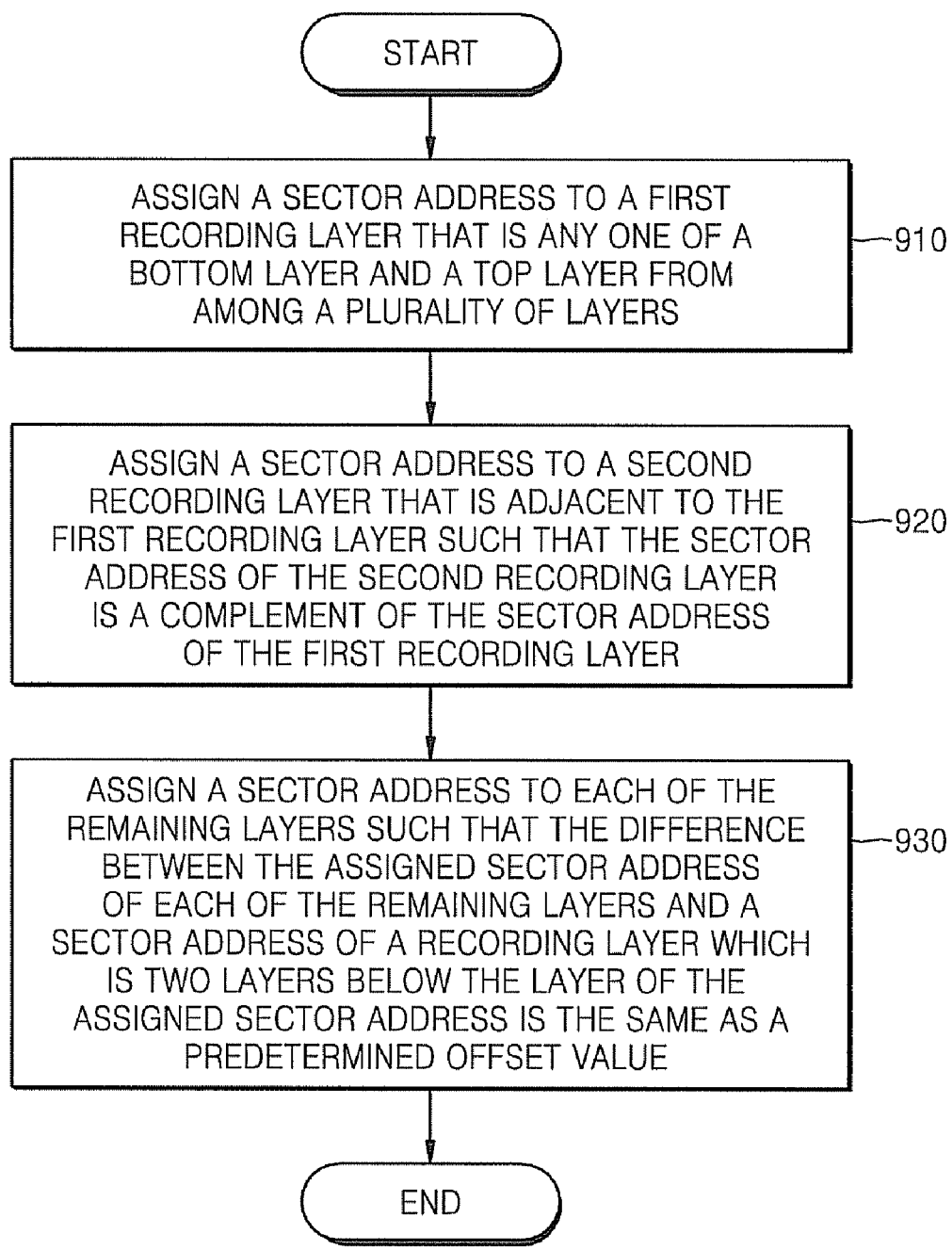
FIG. 9 is a flowchart of a method of assigning a sector address on a multi-layered optical recording medium according to an embodiment of the present invention.

FIG. 9 is a flowchart of a method of assigning a sector address on a multi-layered optical recording medium according to an embodiment of the present invention.

In operation 910, a sector address is assigned to a first recording layer from among a plurality of recording layers. The first recording layer is the top recording layer or the bottom recording layer from among the recording layers. The sector address is assigned to a sector address space that is a part remaining in an entire address space excluding a layer address space. In the case of the first recording layer, the sector address is assigned such that the sector address increases from an inner circumference to an outer circumference.

In operation 920, a sector address is assigned to a second recording layer adjacent to the first recording layer such that the assigned sector is a complement of the sector address of the first recording layer. For example, if the sector address of the first recording layer at a radial position r is 030000h, the sector address of the second recording layer at the radial position r is FCFFFFh. Since the sector address of the first recording layer at a radial position r is a complement of the sector address of the second recording layer at the same radial position r, the difference between the two sector addresses is large. Accordingly, when data is reproduced, even if a light spot is focused on a different layer because of an error, it is less likely that data in the different layer is reproduced since sector addresses are completely different from each other.

The sector addresses of an odd-numbered recording layer from among the recording layers increase from an inner circumference to an outer circumference. The sector addresses of an even-numbered recording layer from among the recording layers increase from an outer circumference to an inner circumference.

In operation 930, a sector address is assigned to the remaining recording layers, excluding the first and second recording layers, such that the difference between the assigned sector address of one of the remaining recording layers and a sector address of another one of the recording layers located two layers below the one of the remaining recording layers already having an assigned sector address is the same as a predetermined offset value. If more bits can be assigned to a sector address, a value that can be used as an offset value can be set to be greater than the length of the assigned sector address. With the increase in size of an offset value, the distance between radii at which identical sector numbers at different recording layers appears increases, and the possibility that a spot is formed in a different layer and thus, incorrect data is reproduced, decreases.

Figure 10:
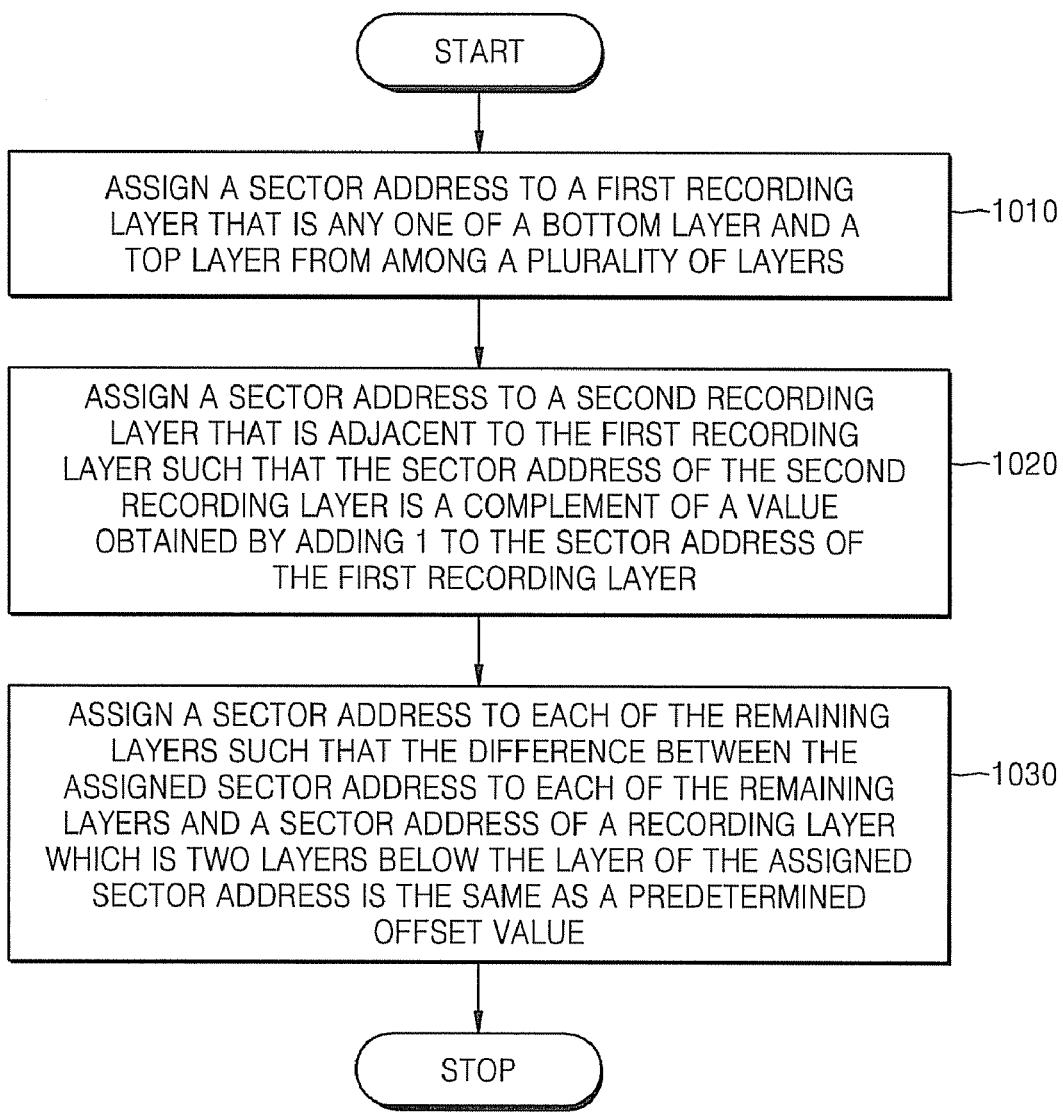
FIG. 10 is a flowchart of a method of assigning a sector address on a multi-layered optical recording medium according to another embodiment of the present invention.

FIG. 10 is a flowchart of a method of assigning a sector address on a multi-layered optical recording medium according to another embodiment of the present invention. FIG. 10 illustrates a method of assigning a sector address when a sector address is assigned to a plurality of sectors, mainly, an even number of sectors.

In operation 1010, a sector address is assigned to a first recording layer that is positioned on the top or at the bottom of a plurality of recording layers.

In operation 1020, a sector address is assigned to a second recording layer adjacent to the first recording layer such that the assigned sector address is a complement of a value obtained by adding 1 to the sector address of the first recording layer. In addition to assigning a sector address to each sector, assigning a sector address to a plurality of sectors by grouping the sectors is also possible. If the number of sectors is an even number of sectors, such as 2, 4, 8, or 16 sectors, the even number of sectors can be grouped. In this case, the sector address to be assigned increases as a multiple of the even number. A complement of this even sector address is an odd sector address. Accordingly, in order to match the complement with an even address in an immediately below layer, a complement of a value obtained by adding 1 to the sector address is obtained. For example, in an optical recording medium in which a sector address is assigned to each two sectors, if the sector address of a first recording layer at a radial position r is 40000h, the sector address of a second recording layer at the radial position r is BFFFFh, which is a complement value obtained by adding 1 to 40000h.

In operation 1030, a sector address is assigned to the remaining recording layers, excluding the first and second recording layers, such that the difference between the assigned sector address and a sector address of a recording layer two layers below the recording layer of the assigned sector address is the same as a predetermined offset value.

Figure 11:
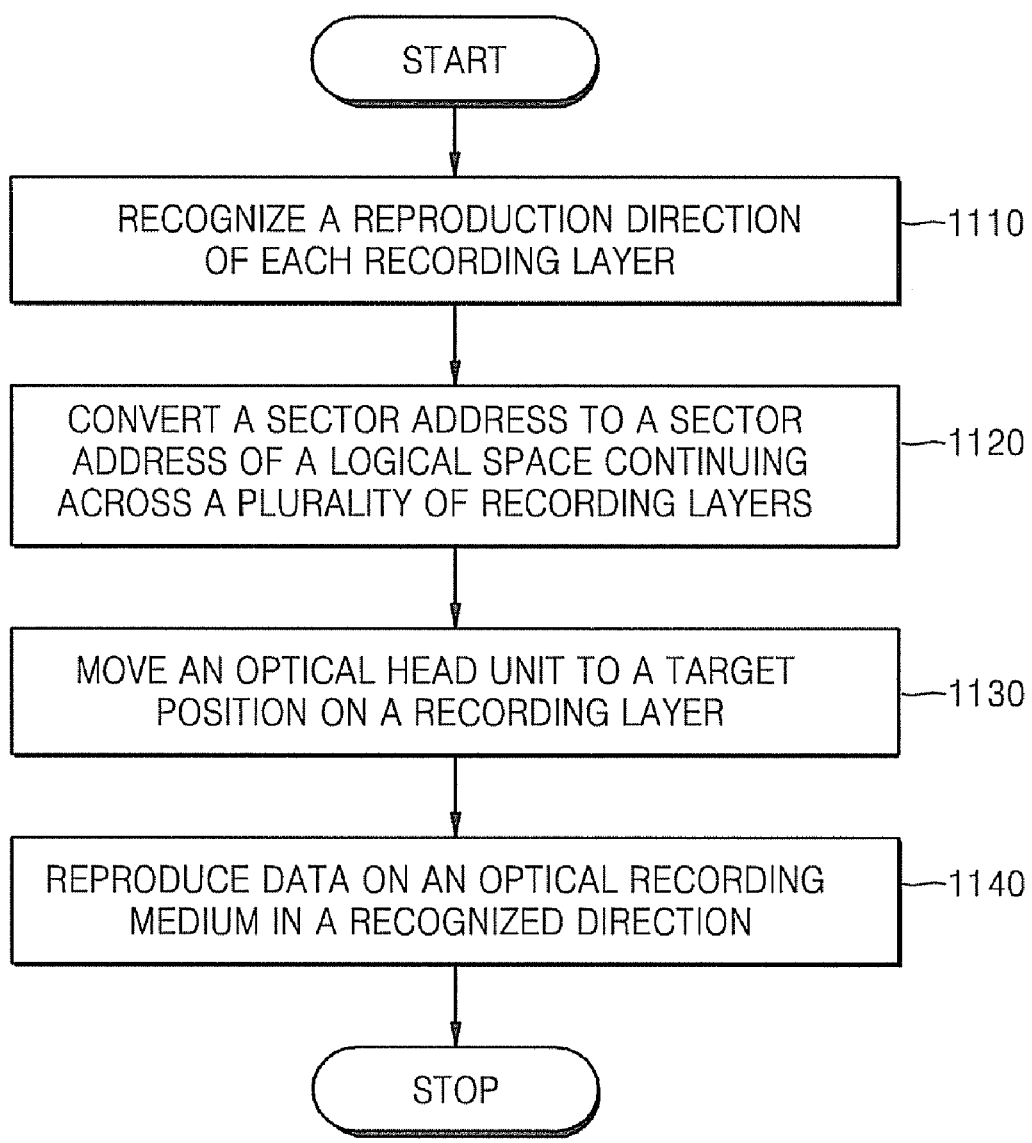
FIG. 11 is a flowchart of a method of reproducing data on an optical recording medium according to an embodiment of the present invention.

FIG. 11 is a flowchart of a method of reproducing data on an optical recording medium according to an embodiment of the present invention.

In operation 1110, a reproduction direction of a sector address on an optical recording medium is detected. The reproduction direction of the sector address can be detected by a variety of methods. For example, a sector address at a first position on a recording layer, on which an optical head unit is focused, is read, and then, after moving the optical head unit in the radial direction, a sector address at a second position, which is at the moved position of the optical head unit, is read. In this way, the sector addresses at the first and second positions can be compared. If the sector address at the first position is less than the sector address at the second position, it can be determined that the reproduction direction is from an inner circumference to an outer circumference. If the sector address at the first position is greater than the sector address at the second position, it can be determined that the reproduction direction is from an outer circumference to an inner circumference.

According to another example of a method of detecting the reproduction direction, a number of a recording layer on which the optical head unit is focused is identified, and according to the number of the recording layer, the reproduction direction of a sector address can be detected. To do so, a reproducing apparatus must identify in advance a correspondence relationship between the number of a recording layer and the reproduction direction.

In operation 1120, a sector address is converted into a logical space continuing across a plurality of recording layers. To do so, an address on an optical recording medium should be converted into an address of a continuous logical space in which the entire recording layers are recognized as one continuous logical space. For example, assuming that an actual address recorded on an optical recording medium is X, X is converted into N, which is a converted sector address that can be used by a host computer in a reproducing apparatus. Hence, the host computer in a reproducing apparatus can interpret a disk having n recording layers as a disk having only one layer of a capacity n times the capacity of one actual layer.

In operation 1130, the optical head unit is moved to a target position on the recording layer. In operation 1140, data on the optical recording medium is reproduced in the detected reproduction direction.

Figure 12:
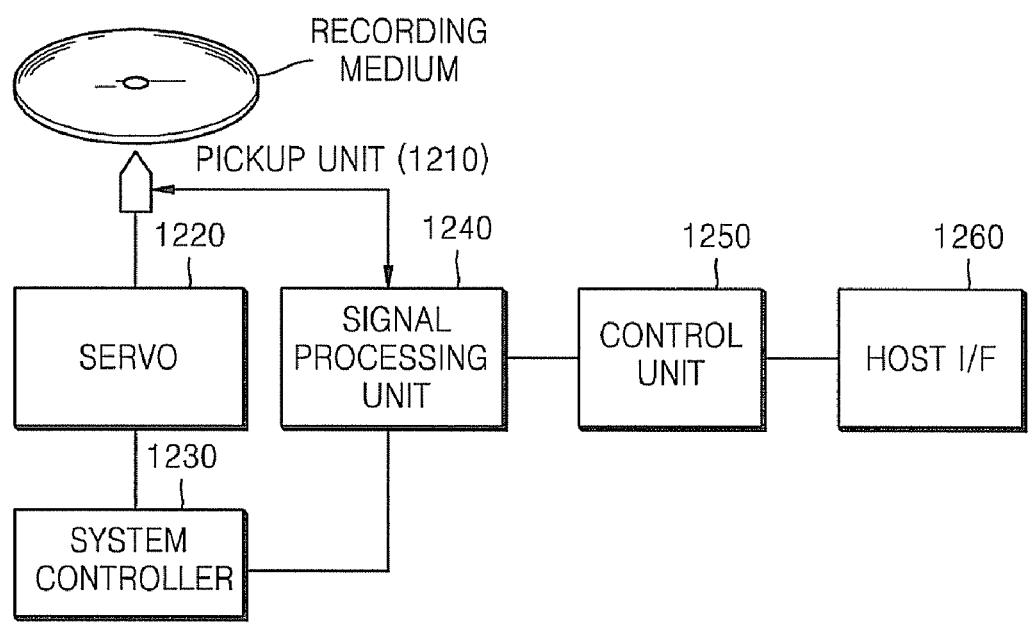
FIG. 12 is a block diagram of an apparatus for recording data on and/or reproducing data from a recording medium according to an embodiment of the present invention.

FIG. 12 is a block diagram of an apparatus for recording data on and/or reproducing data from a recording medium according to an embodiment of the present invention.

The apparatus according to the current embodiment includes a pickup unit 1210, a servo 1220, a system controller 1230, a signal processing unit 1240, a control unit 1250, and a host interface unit 1260.

The pickup unit 1210 reproduces data and other information recorded on a recording medium. The servo 1220 controls the operation of the pickup unit 1210. The signal processing unit 1240 restores a desired signal value from a reproduction signal received from the pickup unit 1210, or converts a signal to a type that can be recorded on the recording medium, and transfers the converted signal.

The control unit 1250 includes an encoder and a decoder. The decoder decodes a signal read from the recording medium, transfers the decoded signal to a host. The encoder converts an input signal into a predetermined format according to a control of the control unit 1250, and transfers the signal to the signal processing unit 1240 so that the signal can be recorded on the recording medium. The host interface unit 1260 receives a command from the host to record or reproduce a data structure, and transfers the command to the control unit 1250. Also, the host interface unit 1260 can receive data from the control unit 1250.

According to a control command of the control unit 1250, the signal processing unit 1240 generates a data block in which an address and data are recorded. Then, the pickup unit 1210 records the generated data block on the recording medium. When a data block is generated by the signal processing unit 1240, the signal processing unit 1240 assigns an address to the data block.

According to an embodiment of the present invention, a sector address is assigned to a first recording layer from among a plurality of recording layers. The first recording layer can be any one of the bottom recording layer and the top recording layer from among the recording layers. Then, a sector address is assigned to a second recording layer, adjacent to the first recording layer, such that the assigned sector address to the second recording layer is a complement of the sector address of the first recording layer. A sector address is assigned to the remaining recording layers, excluding the first and second recording layers, such that the difference between the assigned sector address of one of the remaining recording layers and a sector address of another one of the remaining recording layer located two layers below the one of the remaining recording layers already having an assigned sector address is the same as a predetermined offset value.

According to another embodiment of the present invention, when one sector address is assigned to a plurality of sectors, mainly, an even number of sectors, a sector address is assigned to a first recording layer, which is the top recording layer or the bottom recording layer from among a plurality of recording layers. A sector address is assigned to a second recording layer, adjacent to the first recording layer, such that the assigned sector address to the second recording layer is a complement of a value obtained by adding 1 to the sector address of the first recording layer. A sector address is assigned to the remaining recording layers, excluding the first and second recording layers, such that the difference between the assigned sector address of one of the remaining recording layers and a sector address of another one of the remaining recording layers located two layers below the one of the remaining recording layers having already an assigned sector address is the same as a predetermined offset value.

Figure 13:
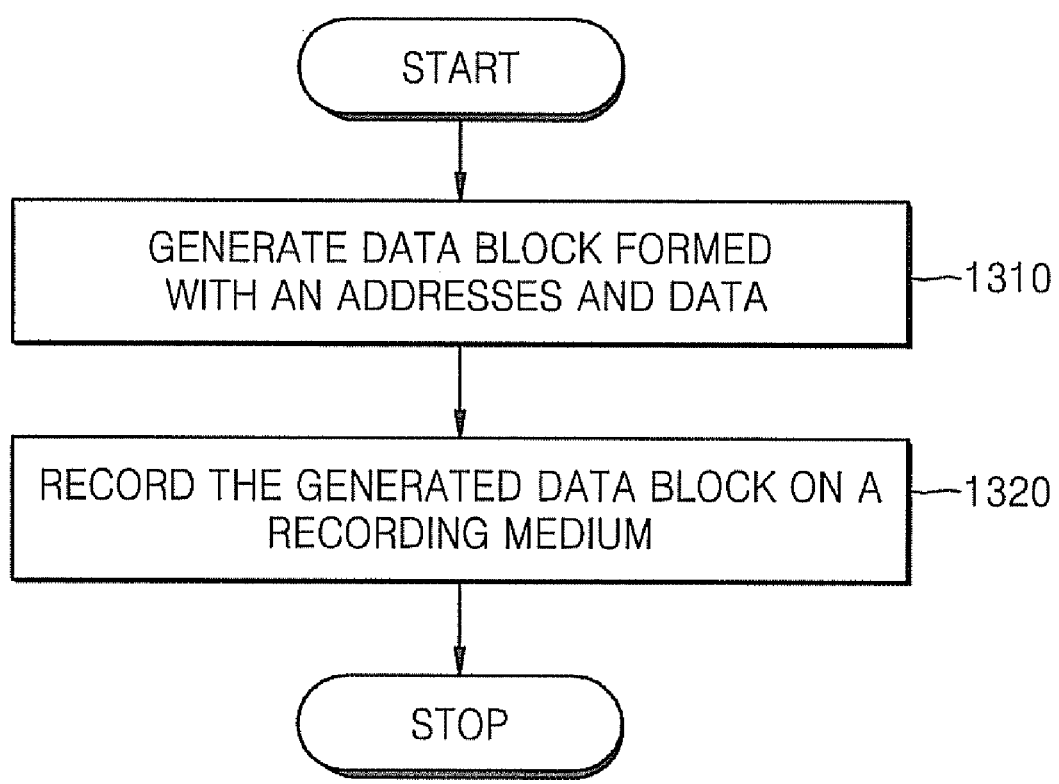
FIG. 13 is a flowchart of a method of recording data on a recording medium according to an embodiment of the present invention.

FIG. 13 is a flowchart illustrating a method of recording a data block on a recoding medium according to an embodiment of the present invention.

In operation 1310, a data block formed with an address and data is generated and a sector address is assigned to a first recording layer from among a plurality of recording layers. The first recording layer can be any one of the bottom recording layer and the top recording layer from among the recording layers. Then, a sector address is assigned to a second recording layer, adjacent to the first recording layer, such that the assigned sector address of the second recording layer is a complement of the sector address of the first recording layer. A sector address is assigned to the remaining recording layers, excluding the first and second recording layers, such that the difference between the assigned sector address of one of the remaining recording layers and a sector address of another one of the recording layers located two layers below the one recording layer already having an assigned sector address is the same as a predetermined offset value.

According to another embodiment of the present invention, when one sector address is assigned to a plurality of sectors, mainly, an even number of sectors, a sector address is assigned to a first recording layer, which is the top recording layer or the bottom recording layer from among a plurality of recording layers. A sector address is assigned to a second recording layer, adjacent to the first recording layer, such that the assigned sector address of the second recording layer is a complement of a value obtained by adding 1 to the sector address of the first recording layer. A sector address is assigned to the remaining recording layers, excluding the first and second recording layers, such that the difference between the assigned sector address of one of the remaining recording layers and a sector address of another one of the remaining recording layers located two layers below the recording layer having already an assigned sector address is the same as a predetermined offset value.

In operation 1320, the generated data block is recorded on a recording medium.

The servo 1220 of a recording apparatus for the recording medium controls the pickup unit 1210 so that the data block is recorded on the recording medium.

According to an aspect of the present invention as described above, different sector addresses are assigned to different recording layers, respectively, by using a predetermined offset value, and thereby, preventing reproduction of data at an incorrect position.

In addition, by accurately moving an optical head to a desired position through address conversion of a sector address on a recording layer, data on an optical recording medium can be reproduced.

An aspect of the present invention can also be embodied as computer readable codes on a computer readable recording medium. The computer readable recording medium is any data storage device that can store data, which can be thereafter read by a computer system.

Examples of the computer readable recording medium include read-only memory (ROM), random-access memory (RAM), CD-ROMs, magnetic tapes, floppy disks, optical data storage devices. An aspect of the present invention can also be embodied as carrier waves having data signals (such as data transmission through the Internet), which can be interpreted by a recording and/or reproducing apparatus (such as a computer).

While an aspect of the present invention has been particularly shown and described with reference to exemplary embodiments thereof, it will be understood by one of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An optical recording medium for use with a recording and/or reproducing apparatus, the optical recording medium comprising:

a plurality of recording layers, a first sector address being assigned to a first recording layer which is a complement of a second sector address assigned to a second recording layer adjacent to the first recording layer, a sector address of each of the remaining recording layers being assigned such that a difference between the assigned sector address of each of the remaining recording layers and a sector address of a recording layer which is two layers below the recording layer of the assigned sector address is the same as a predetermined offset value, the first recording layer being any one of the bottom recording layer and the top recording layer from among the plurality of recording layers, wherein, if the number of recording layers is an even number, the offset value is less than or equal to a value obtained by dividing a spare address space, which remains after storing data, by (the number of the recording layers)/2, and wherein, if the number of the recording layers is an odd number, the offset value is less than or equal to a value obtained by dividing a spare address space, which remains after storing data, by (the number of the recording layers +1)/2.

2. The optical recording medium of claim 1, wherein:

the sector address on an odd-numbered recording layer from among the plurality of recording layers increases from one circumference side to the other circumference side, and the sector address on an even-numbered recording layer from among the plurality of recording layers increases from the other circumference side to the one circumference side; and the one circumference side is any one of an innermost circumference and an outermost circumference, and the other circumference side is the other of the innermost circumference and the outermost circumference.

3. The optical recording medium of claim 2, wherein each of the plurality of recording layers has a different layer address, and the layer address is identical for all sectors on a same recording layer.

4. The optical recording medium of claim 1, wherein the offset value prevents sector addresses of different recording layers at an identical radial position from being identical.

5. An optical recording medium for use with a recording and/or reproducing apparatus, the optical recording medium comprising:

a plurality of recording layers, each of the recording layers comprising a plurality of sectors, a sector address being assigned to an even number of sectors from among the plurality of sectors, such that a value obtained by adding 1 to the sector address of a first recording layer is a complement of the sector address of a second recording layer adjacent to the first recording layer, the sector address of each remaining recording layer being assigned such that a difference between the assigned sector address of each of the remaining recording layers and a sector address of a recording layer which is two layers below the recording layer of the assigned sector address is the same as a predetermined offset value, the first recording layer being any one of the bottom recording layer and the top recording layer from among the recording layers, wherein, if the number of recording layers is an even number, the offset value is less than or equal to a value obtained by dividing a spare address space, which remains after storing data, by (the number of the recording layers)/2, and wherein, if the number of the recording layers is an odd number, the offset value is less than or equal to a value obtained by dividing a spare address space, which remains after storing data, by (the number of the recording layers +1)/2.

6. A method of assigning an address on an optical recording medium having a plurality of recording layers, the method comprising:

assigning a first sector address to a first recording layer, which is any one of a bottom recording layer and a top recording layer from among the plurality of recording layers;

assigning a second sector address to a second recording layer, adjacent to the first recording layer, such that the second sector address of the second recording layer is a complement of the first sector address of the first recording layer; and assigning another sector address to each of the remaining recording layers, excluding the first and the second recording layers, such that a difference between the assigned sector address of one of the remaining recording layers and a sector address of a recording layer which is two layers below the recording layer of the assigned sector address is the same as a predetermined offset value, wherein if the number of recording layers is an even number, the offset value is less than or equal to a value obtained by dividing a spare address space, which remains after storing data, by (the number of the recording layers)/2, and wherein, if the number of recording layers is an odd number, the offset value is less than or equal to a value obtained by dividing a spare address space, which remains after storing data, by (the number of the recording layers +1)/2.

7. The method of claim 6, wherein:

the sector address on an odd-numbered recording layer from among the plurality of recording layers increases from one circumference side to the other circumference side, and the sector address on an even-numbered recording layer from among the recording layers increases from the other circumference side to the one circumference side; and the one circumference side is any one of an innermost circumference and an outermost circumference, and the other circumference side is the other of the innermost circumference and the outermost circumference.

8. The method of claim 7, wherein the offset value prevents sector addresses of different recording layers at an identical radial position from being identical.

9. A method of assigning an address on an optical recording medium having a plurality of recording layers, the method comprising:

assigning a first sector address to a first recording layer, which is any one of a bottom recording layer and a top recording layer from among the plurality of recording layers;

assigning a second sector address to a second recording layer, adjacent to the first recording layer, such that the second sector address is a complement of a value obtained by adding 1 to the first sector address of the first recording layer; and assigning another sector address to each of the plurality of recording layers, excluding the first and second recording layers, such that a difference between the assigned sector address of one of the plurality of recording layers and the sector address of another one of the plurality of recording layers located two layers below the one of the plurality of recording layers already having an assigned sector address is the same as a predetermined offset value, wherein each one of the plurality of recording layers comprises a plurality of sectors and one sector address is assigned to an even number of sectors from among the sectors, wherein, if the number of recording layers is an even number, the offset value is less than or equal to a value obtained by dividing a spare address space, which remains after storing data, by (the number of the recording layers)/2, and wherein, if the number of the recording layers is an odd number, the offset value is less than or equal to a value obtained by dividing a spare address space, which remains after storing data, by (the number of the recording layers +1)/2.

10. A method of reproducing data on a multi-layered optical recording medium, the method comprising:

moving an optical head unit to a target position corresponding to an address on a recording layer; and reproducing data on the optical recording medium at the moved position, wherein in the address on the recording layer, a sector address is assigned such that a first sector address of a first recording layer is a complement of a second sector address of a second recording layer adjacent to the first recording layer, wherein a sector address of each remaining recording layer is assigned such that a difference between the assigned sector address of one of the recording layers and the sector address of another one of the recording layers located two layers below the one of the recording layers already being assigned the sector address is the same as a predetermined offset value, wherein the first recording layer is any one of a bottom recording layer and a top recording layer from among the recording layers, wherein, if the number of recording layers is an even number, the offset value is less than or equal to a value obtained by dividing a spare address space, which remains after storing data, by (the number of the recording layers)/2, and wherein, if the number of the recording layers is an odd number, the offset value is less than or equal to a value obtained by dividing a spare address space, which remains after storing data, by (the number of the recording layers +1)/2.

* * * * *